(12) United States Patent
Belanger

(10) Patent No.: US 11,072,312 B2
(45) Date of Patent: Jul. 27, 2021

(54) ROTARY VEHICLE WASH COMPONENT HAVING OFFSET MEDIA ELEMENTS

(71) Applicant: WashMe Properties, LLC, Northville, MI (US)

(72) Inventor: Michael J. Belanger, Northville, MI (US)

(73) Assignee: Washme Properties, LLC, Northville, MI (US)

( * ) Notice: Subject to any disclaimer, the term of this patent is extended or adjusted under 35 U.S.C. 154(b) by 11 days.

(21) Appl. No.: 16/214,014

(22) Filed: Dec. 7, 2018

(65) Prior Publication Data

US 2019/0176771 A1     Jun. 13, 2019

Related U.S. Application Data

(60) Provisional application No. 62/596,025, filed on Dec. 7, 2017.

(51) Int. Cl.
*B60S 3/06* (2006.01)
*A46B 9/00* (2006.01)

(52) U.S. Cl.
CPC ............... *B60S 3/06* (2013.01); *B60S 3/063* (2013.01); *B60S 3/066* (2013.01); *A46B 9/005* (2013.01); *A46B 2200/3046* (2013.01)

(58) Field of Classification Search
CPC .. B60S 3/06; B60S 3/063; B60S 3/066; A46B 2200/3046
See application file for complete search history.

(56) References Cited

U.S. PATENT DOCUMENTS

| | | | | |
|---|---|---|---|---|
| 4,815,158 A | * | 3/1989 | Crotts | B60S 3/066 15/179 |
| 2009/0241989 A1 | * | 10/2009 | MacNeil | A46B 13/008 134/6 |
| 2010/0031459 A1 | * | 2/2010 | Holbus | A46B 13/005 15/97.3 |
| 2013/0019419 A1 | * | 1/2013 | Favagrossa | B60S 3/002 15/53.1 |
| 2017/0203736 A1 | * | 7/2017 | Belanger | A46B 7/10 |

* cited by examiner

*Primary Examiner* — Randall E Chin
(74) *Attorney, Agent, or Firm* — Dickinson Wright, PLLC

(57) ABSTRACT

A rotary vehicle wash component for a vehicle wash facility is provided. The vehicle wash component includes a hub disposed about and rotatable about a center axis. A plurality of media elements extend outwardly from the hub for rotation with the hub. Each of the media elements has a centerline that is positioned offset relative to the center axis such that the centerline does not intersect the center axis. The media elements may be fixed to the hub or they may be pivotable relative to the hub. The media elements may pivot between two offset positions in response to rotation in opposite directions. The media elements may include a plurality of treatment heads secured to the media elements.

24 Claims, 6 Drawing Sheets

ROTARY VEHICLE WASH COMPONENT HAVING OFFSET MEDIA ELEMENTS

CROSS-REFERENCE TO RELATED APPLICATIONS

This application claims the benefit of previously filed U.S. Provisional Patent Application No. 62/596,025, filed Dec. 7, 2017, titled "Rotary Vehicle Wash Component Having Offset Media Elements," the entire contents of which are hereby incorporated by reference in its entirety.

TECHNICAL FIELD

The present disclosure relates generally to a rotary vehicle wash component for a vehicle wash facility. More particularly, the present disclosure relates to a rotary vehicle wash component for a vehicle wash facility having media elements that are positioned to increase their contact area against passing vehicles during rotation of the brush assembly.

BACKGROUND OF THE DISCLOSURE

It is well-known to use power-driven rotating wash components in vehicle wash facilities to wash, buff and/or polish the exterior surfaces of vehicles that pass through the wash facility. Such rotary wash components are typically configured to wash or buff the sides and end surfaces of vehicles, as well as horizontal surfaces, windows and wheels. Such rotary wash components typically include a hub that is rotatable about a center axis and connected to a drive mechanism for providing the rotational movement of the component. A plurality of media elements are generally connected to, and extend radially outwardly from the hub for engaging the vehicle exterior during rotation of the wash component to provide the washing or buffing effect such as through frictional engagement. As these media elements extend from the hub in a generally perpendicular orientation they are in a generally perpendicular arrangement with a vehicle exterior such that only a distal portion of the media elements typically make contact a vehicle during each rotation to effect cleaning.

There, thus, remains a need for improvements to such rotary vehicle wash components to provide improved washing or buffing capabilities.

SUMMARY OF THE DISCLOSURE

It is an aspect of the present disclosure to provide a vehicle wash component that provides an increased contact area of the media elements against exterior surfaces of passing vehicles to provide improved cleaning.

It is a related aspect of the present disclosure to provide a vehicle wash component that provides such an increased contact area of the media elements against passing vehicles while the vehicle wash component rotates in both a clockwise direction and counterclockwise direction.

According to the above and other aspects of the disclosure, a rotary vehicle wash component for a vehicle wash facility is provided. The vehicle wash component includes a hub disposed about and rotatable about a center axis. A plurality of wash media elements extend outwardly from the hub for rotation with the hub. Each of the media elements is positioned offset relative to the center axis such that a face portion of each wash media element can engage the vehicle exterior.

According to yet another aspect of the disclosure, the plurality of media elements are pivotable relative to the hub such that they may be arranged in a desired offset position relative to the center axis depending on whether the vehicle wash component is configured to rotate in a clockwise or counterclockwise direction.

BRIEF DESCRIPTION OF THE DRAWINGS

Other aspects of the present disclosure will be readily appreciated, as the same becomes better understood by reference to the following detailed description when considered in connection with the accompanying drawings wherein.

DESCRIPTION OF THE ENABLING DISCLOSURE

Referring to the figures wherein like numerals indicate corresponding parts throughout the several views, a rotary vehicle wash component 20, 100 for a vehicle wash facility is generally shown. The disclosed rotary vehicle wash component may be utilized in any vehicle wash facility. For example, it may be used in a tunnel wash facility that propels vehicles through a wash area on a conveyor such that the vehicle passes stationary wash components. Likewise, the disclosed rotary vehicle wash component may be used in a roll-over type facility in which the vehicle remains stationary throughout the cleaning process while the components travel along and around the vehicle to perform the cleaning process. The disclosed rotary vehicle wash component 20, 100 may be utilized to clean any type of vehicle including, but not limited to, automobiles and recreational vehicles. It will be appreciated that the wash component may be employed in a variety of other types of washes such as self-service washes. It will also be appreciated that the wash component may be employed to treat a variety of different types of items.

Figure 1:
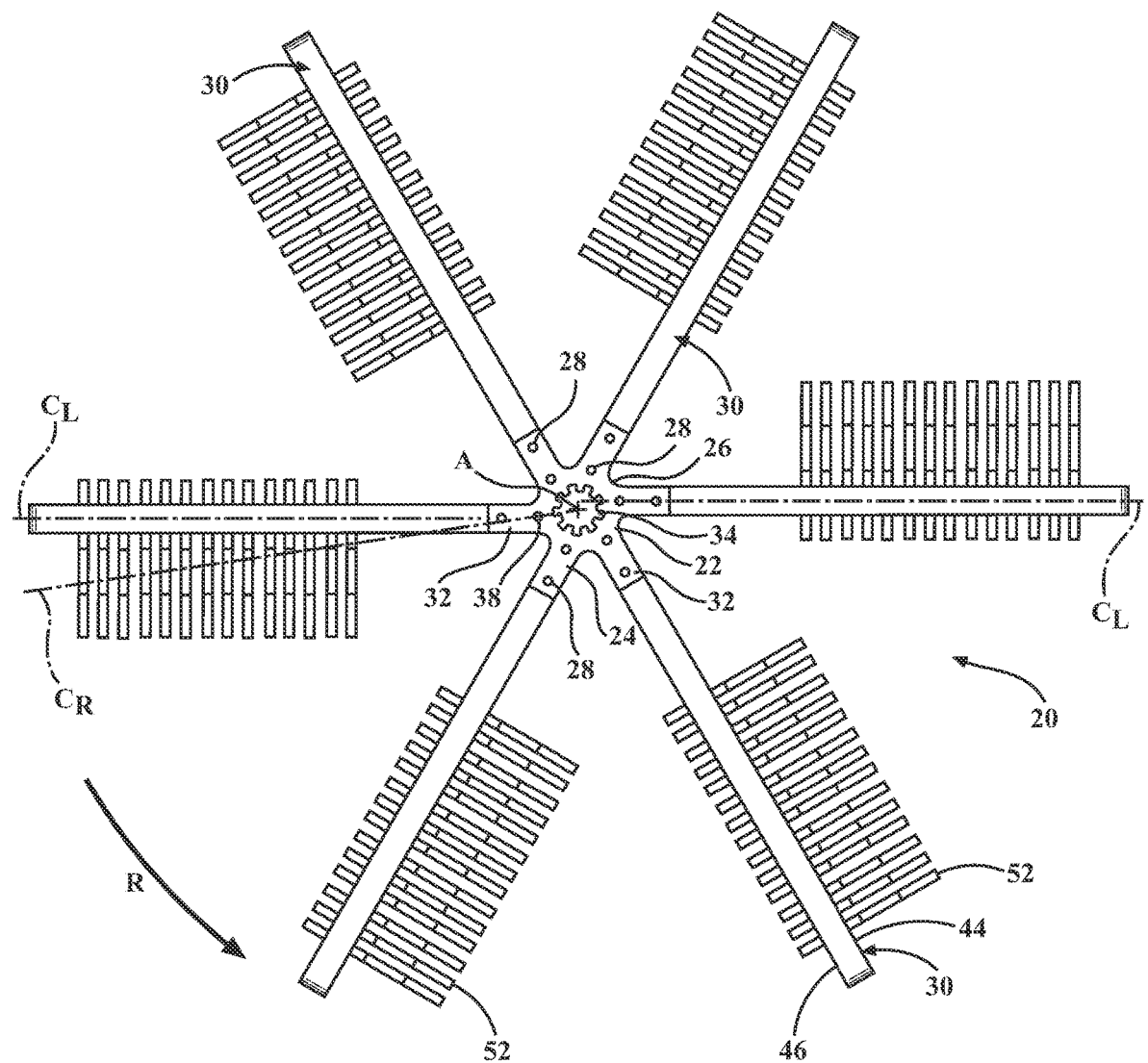
FIG. 1 is a top view of a rotatable vehicle wash component according to an aspect of the disclosure.
Figure 2:
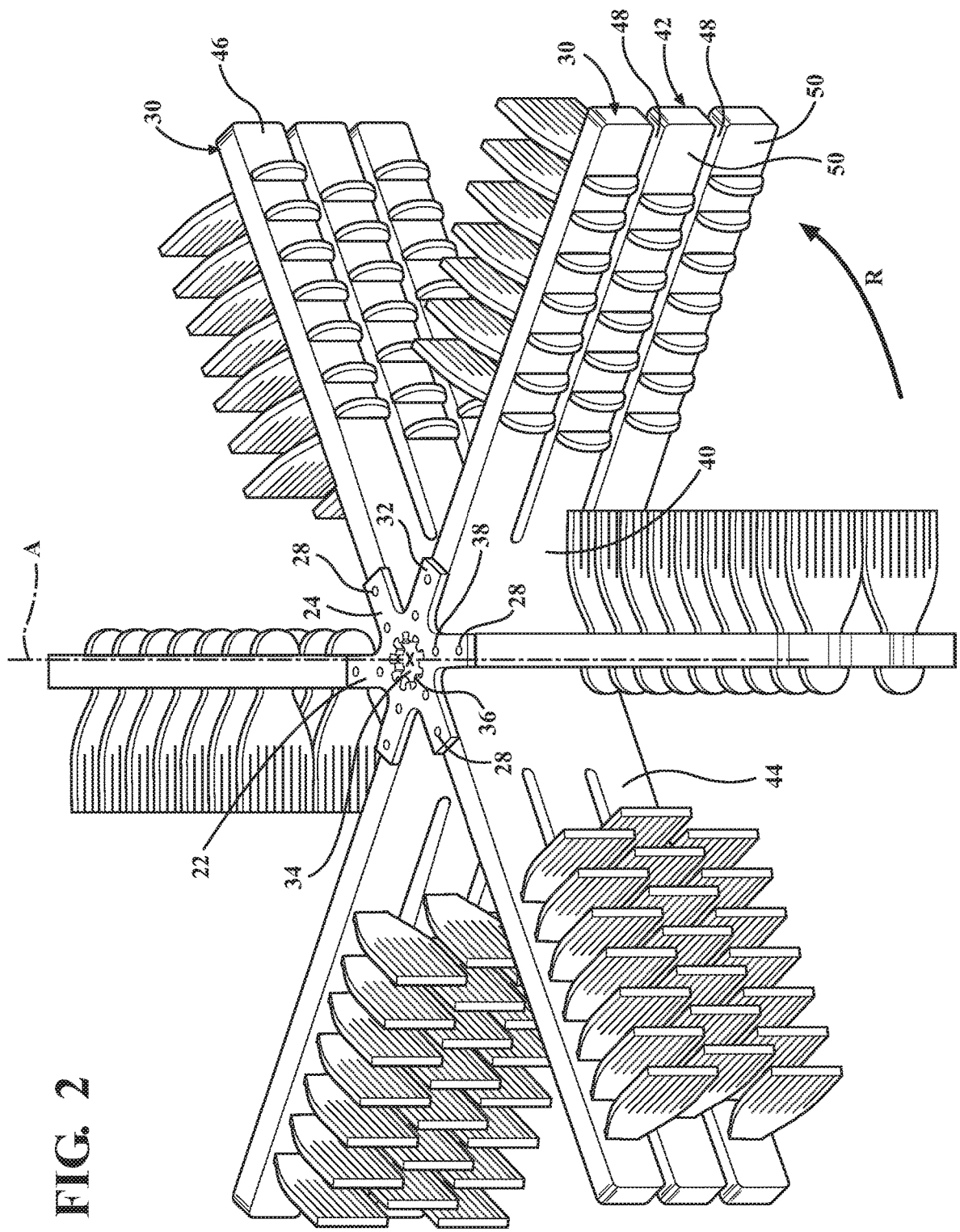
FIG. 2 is a perspective view of the rotatable vehicle wash component of FIG. 1.

FIGS. 1 and 2 illustrate a rotary vehicle wash component 20 according to an aspect of the present disclosure. The rotary vehicle wash component 20 includes a hub 22 that defines and is rotatable about a center axis A. The hub 22 includes a pair of end caps 24, 26 and a plurality of securement rods 28. The pair of end caps 24, 26 are positioned in spaced and parallel relationship from one another and oriented perpendicular to the center axis A. According to an aspect, the plurality of securement rods 28 extend between and connect the end caps 24, 26. The plurality of securement rods 28 are uniformly spaced around and oriented generally parallel to the center axis A. It should be appreciated that the hub 22 may have a variety of different configurations. A plurality of media elements 30 may be connected to the hub 22 such that they extend radially outwardly relative to the center axis A for engaging vehicles as they pass through the vehicle wash facility during rotation of the brush assembly 20.

Each of the end caps 24, 26 may have a generally circular-shaped base with a plurality of flanges 32 which extend radially outwardly from the center axis A. Each end cap 24, 26 defines an opening 34 along the center axis A for connecting to a driving shaft. A plurality of splines 36 are defined about the opening 34 for rotationally securing the shaft to the hub 22 to effect rotation thereof. Each of the flanges 32 includes at least one securement orifice 38. According to an aspect shown in FIGS. 1-2, the securement orifices 38 on each flange 32 are aligned. According to an aspect, each of the flanges 32 defines a centerline (CO and that extends outwardly from the opening 34 such that the centerline does not intersect that center axis A of the hub 22. In other words, each of the flanges 32 extends along vector that is offset from the center axis A.

Each media element 30 is sandwiched between and coupled to a flange 32 of each of the end caps 24, 26. The flanges 32 of opposite end caps 24, 26 are axially aligned with one another, therefore also aligning the securement orifices 38 of the end caps 24, 26 with one another. According to an aspect, the securement rods 28 extend through opposing securement orifices 38 on the upper and lower end caps 24, 26 and engage the media elements 30 to secure them to the hub 22. According to an aspect, the securement rods 28 fixedly secure the media elements 30 to the flanges 32 in the offset position relative to the center axis A. It should be appreciated that any number of securement orifices 38 and securement rods 28 could be utilized to fix the media elements 30 to the hubs 22.

As best illustrated in FIG. 2, each of the media elements 30 extends from a proximal end 40 adjacent the hub 22 to a distal end 42 spaced from the hub 22. Each of the media elements 30 also has a front face 44 and a back face 46. According to an aspect, each of the media elements 30 can define a pair of elongated slots 48 that extend from the distal end 42 toward the proximal end 40 to divide the media element 30 into a plurality of elongated fingers 50 that are positioned in spaced and parallel relationship with one another. A plurality of treatment heads 52 may be fixed to the front face 44 of each of the media elements 30 along the fingers 50 for providing additional scrubbing of passing vehicles. The treatment heads 52 may be formed of an EVA material. The treatment heads 52 may be formed of a variety of different materials and can have a variety of different shapes. According to an aspect, they may be secured to the media elements 30 along their elongated fingers 50.

According to an aspect, the wash media elements 30 are substantially self-supporting and maintain their effective working length regardless of the rotational speed of the brush. Because the wash media elements 30 are self-supporting, they exert a consistent pressure on the vehicle surface, and make contact at more or less predetermined locations, regardless of the brush's rotational speed. The wash media elements 30 may be designed with a desired "spring pressure" by means of material selection, length, thickness, shaped and depth of cut from the distal to proximal ends as discussed in more detail herein. According to an aspect, the wash media elements 30 are elongate structures that may be constructed of an EVA foam. However, the wash media elements may be constructed of a variety of other suitable materials. It will also be understood that the wash media elements can have a variety of different shapes and configurations.

Figure 5:
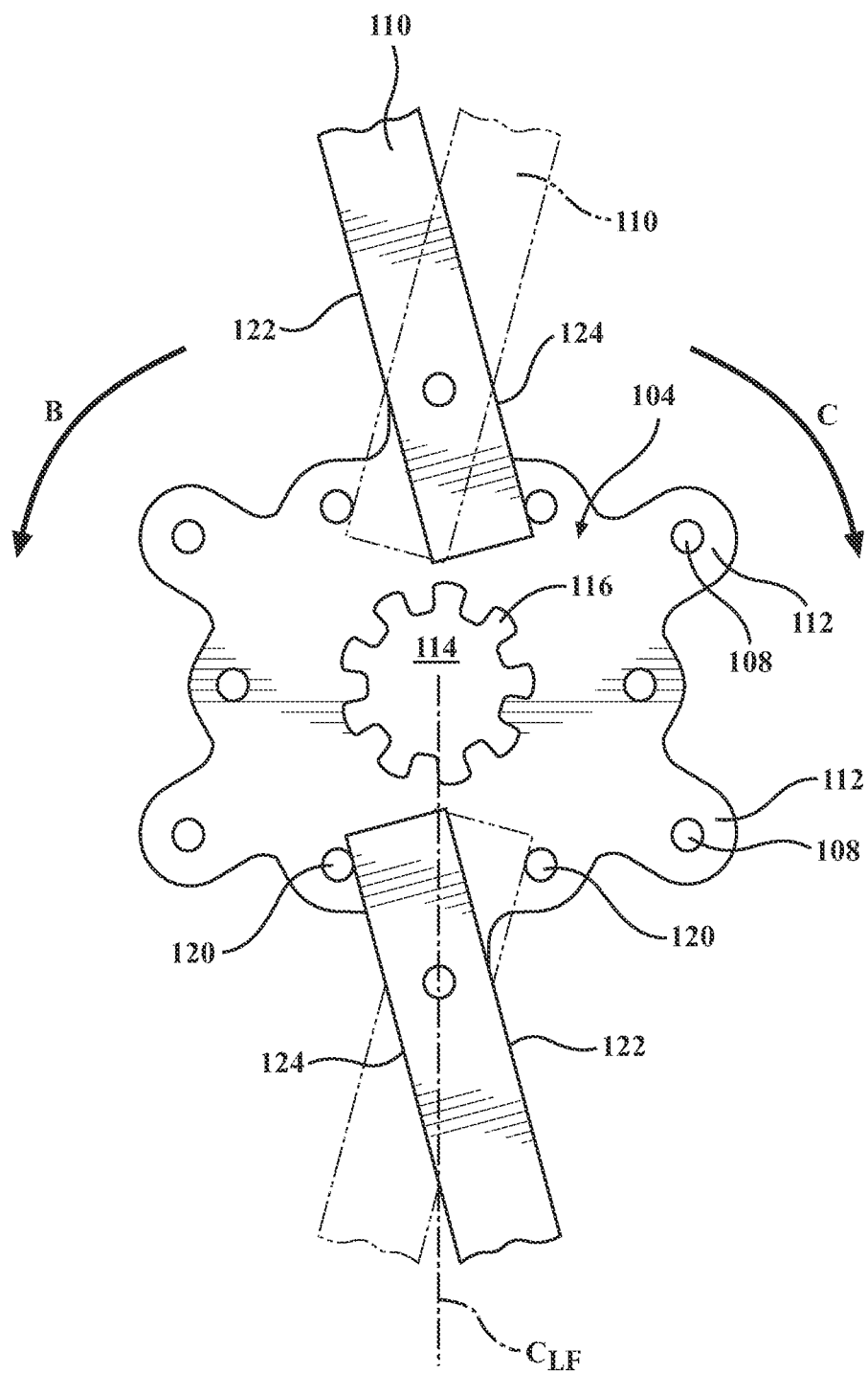
FIG. 5 is an enlarged view of the interface between a hub and media elements for the rotatable vehicle wash component of FIG. 3.

According to an aspect, the media elements 30 may be evenly spaced from one another about the center axis A. According to this aspect, the media elements 30 may be positioned at approximately a sixty degree (60°) angle relative to an adjacent media element 30. It will be appreciated that the number of media elements disposed around the hub depends on the size of the hub. It should be appreciated that the media elements 30 could be positioned at other angles relative to one another. According to an aspect, each of the media elements 30 can extend from the hub 22 at an angle from a location that is offset relative to the center axis A, as discussed above. According to a further aspect, each media element 30 may extend from the hub 22 such that it is angled rearward (opposite the direction of rotation R) with respect to a reference line CR drawn between the center axis A and one of the securement orifices 38 or other reference point along centerline CL (FIG. 5 illustrates a similar aspect in which wash media element 110 may pivot about a pivot point, and the relative angle is readily apparent with reference to this Figure). Orienting the media elements 30 in this arrangement provides a greater contact area of the front face 44 of each wash media element 30 and treatment heads 52 against passing vehicles during each rotation of the wash component 20 as compared to conventional media elements that extend in a direction with a centerline that intersects the center axis A. In other words, a greater portion of the front face 44 of each wash media element 30 is exposed when the wash media element 30 is brought into contact with a vehicle exterior.

Figure 3:
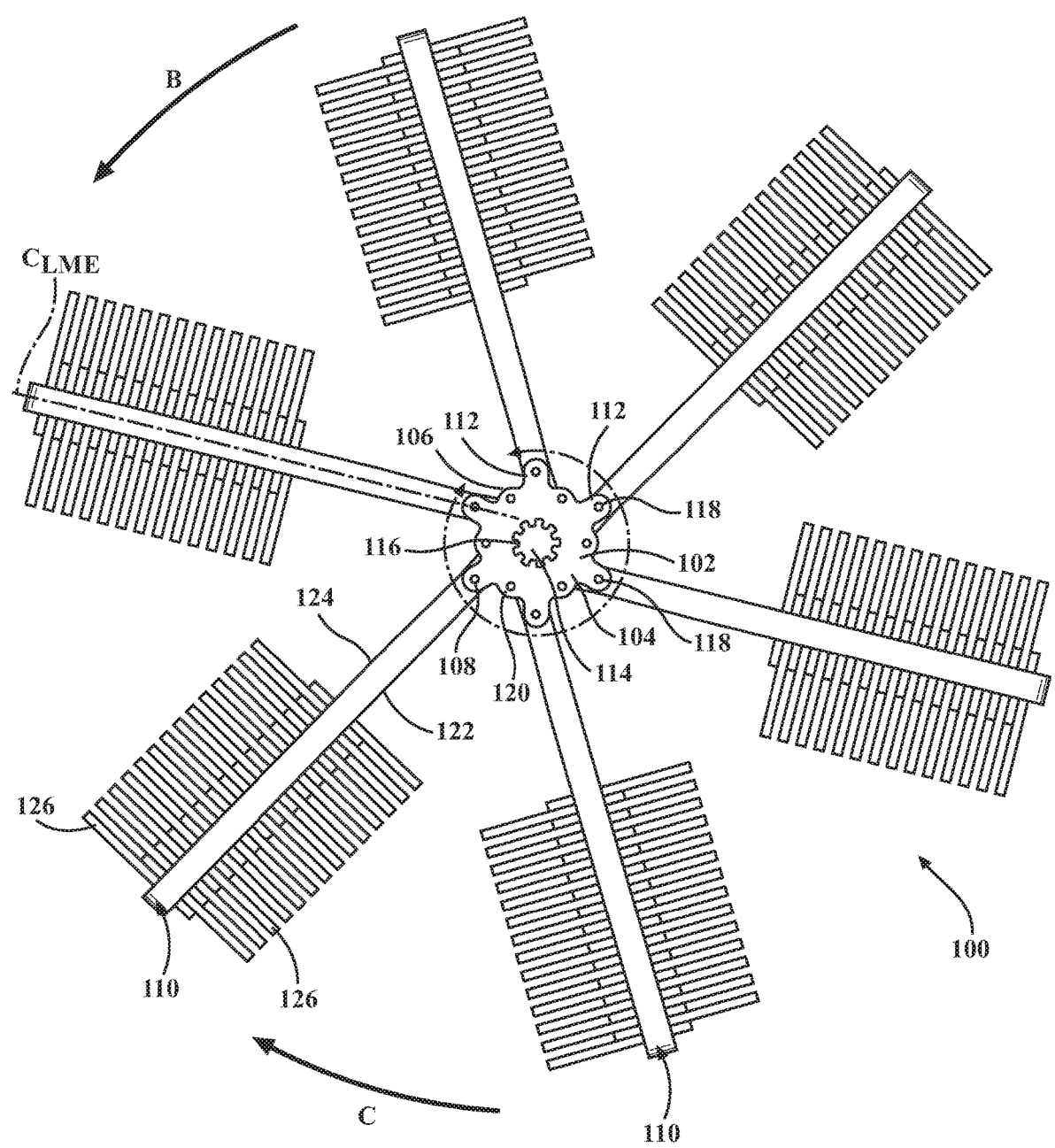
FIG. 3 is a top view of a rotatable vehicle wash component according to another aspect of the disclosure.
Figure 4:
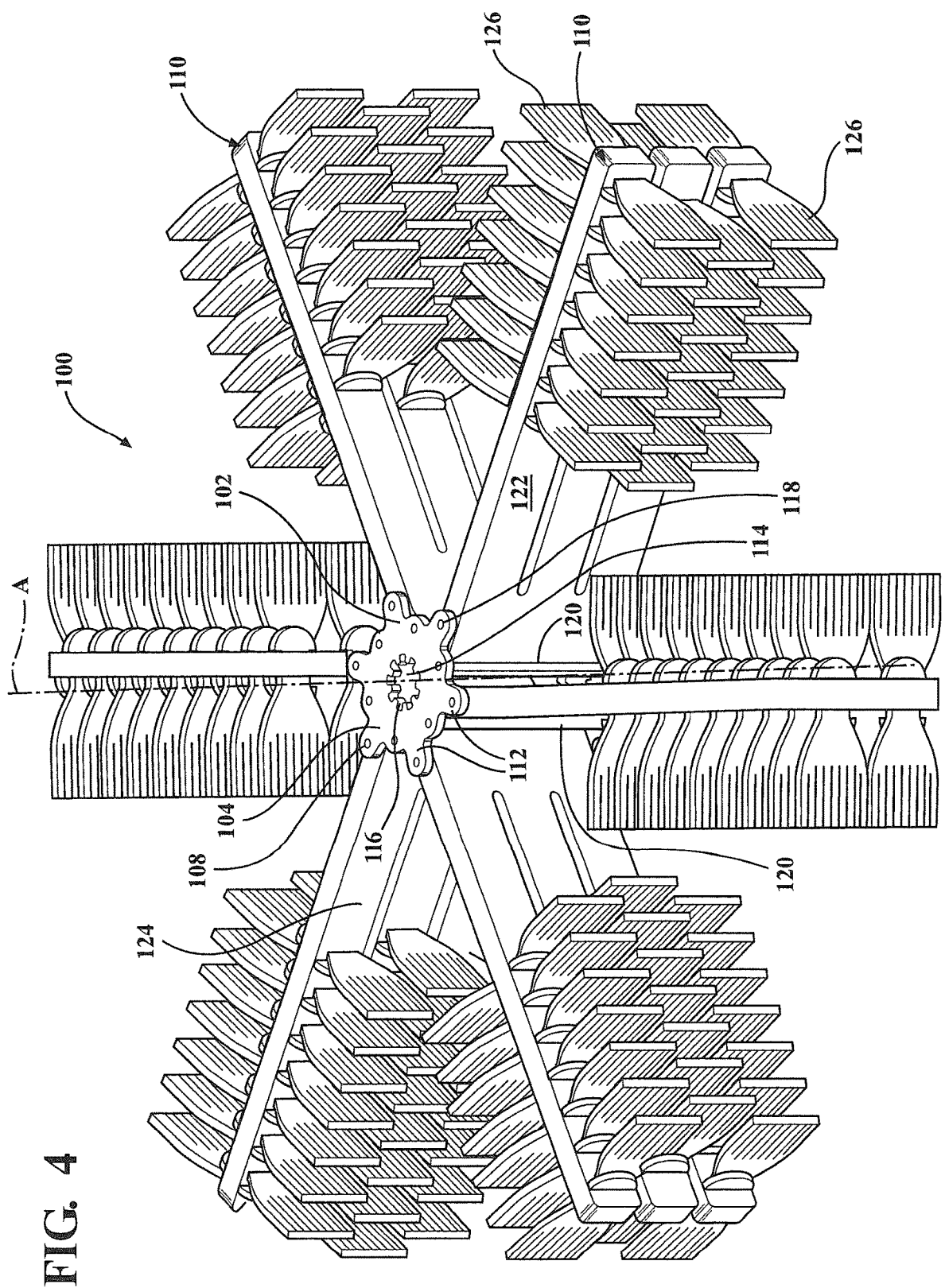
FIG. 4 is a perspective view of the rotatable vehicle wash component of FIG. 3.

FIGS. 3 and 4 illustrate a rotary vehicle wash component 100 according to another aspect of the present disclosure. The rotary vehicle wash component 100 includes a hub 102 that defines and is rotatable about a center axis A. The hub 102 includes a pair of end caps 104, 106 and a plurality of securement rods 108. The pair of end caps 104, 106 are positioned in spaced and parallel relationship from one another and oriented perpendicular to the center axis A. According to an aspect, a plurality of securement rods 108 extend between and connect the end caps 104, 106. The plurality of securement rods 108 are uniformly spaced around and oriented generally parallel to the center axis A. It should be appreciated that the hub 102 may have a variety of different configurations. A plurality of media elements 110 may be connected to the hub 102 such that they extend radially outwardly relative to the center axis A for engaging vehicles as they pass through the vehicle wash facility during rotation of the brush assembly 100.

As best illustrated in FIGS. 3 and 5, each of the end caps 104, 106 may have a generally circular-shaped base with a plurality of flanges 112 which extend radially outwardly from the center axis A. Each end cap 104, 106 defines an opening 114 along the center axis A for connecting to a driving shaft. A plurality of splines 116 are defined about the opening 114 for rotationally securing the shaft to the hub 102 to effect rotation thereof. Each of the flanges 112 includes at least one securement orifice 118. Each of the flanges 112 defines a centerline ($C_{LF}$), which is oriented to intersect the center axis A, passing through the securement orifice 118. It should be appreciated that any number of securement orifices 118 and securement rods 108 could be utilized to fix the media elements 110 to the hub 102.

Each media element 110 is secured between and coupled to a flange 112 on each of the end caps 104. The flanges 112 of opposite end caps 104, 106 are axially aligned with one another, therefore also aligning the securement orifices 118 of the end caps 104, 106 with one another. The securement rods 108 extend through opposing securement orifices 118 on the upper and lower end caps 104, 106 to engage the media elements 110 and secure them to the hub 102. The securement rods 108 are fixedly secured to the media element 110, but are in pivotal relationship with the securement orifices 118. Alternatively, the securement rods 108 may be fixedly secured to the securement orifices 118 and pivotally secured to the media element 110.

According to an aspect, each of the media elements 110 are pivotably connected to the flanges 112 about the securement rod 108 to allow the media elements 110 to be pivoted at various angles with respect to the centerline $C_{LF}$ such that the angle of the centerline $C_{LME}$ of the wash media elements 110 is offset with respect to the centerline $C_{LF}$. According to a further aspect, a pair of limiting elements 120 are positioned on opposite sides of each of the securement orifices 118 for limiting pivoting movement of the media elements 110. As best illustrated in FIG. 5, the limiting elements 120 limit rotation of the media elements 110 between a clockwise rotation position C and a counterclockwise rotation position B. According to an aspect, the wash media elements 110 may be configured as discussed above and may have a first face 122 and a second face 124. The wash media elements may have a plurality of treatment heads 126 secured to each of the first face 122 and the second face 124.

According to this aspect, the media element 110 is capable of pivoting approximately 32 degrees between the clockwise and counterclockwise positions B, C, as shown in FIG. 5. It will be appreciated, however, that other degrees of pivoting could be utilized. According to another aspect, the limiting elements 120 are pins that extend through flanges 112, however, other types of limiting elements 120 could be utilized. According to an aspect, the wash media elements 110 can pivot with respect to the flanges 112 based on centrifugal force. Upon rotation of the hub 102 in a clockwise direction C, the media elements 110 will pivot such that they are positioned in rotation position B with an inner edge of the second face 124 contacting one of the limiting pins 120 to limit pivoting thereof. In this position, the second face 124 and the associated treatment heads are brought into contact with a vehicle exterior at an angle. This allows for greater contact of the second face 124 with a vehicle exterior and improved cleaning. According to an aspect, upon rotation of the hub 102 in a counter-clockwise direction B, the media elements 110 can pivot such that they are position in rotation position C with an inner edge of the first face 122 contacting one of the limiting pins 120 to limit pivoting thereof. In this position, the first face 122 and the associated treatment heads are brought into contact with a vehicle exterior at an angle. This allows for greater contact of the first face 122 with a vehicle exterior and improved cleaning. The rotary brush 100 can thus accommodate improved cleaning in both directions of rotation, which can be particularly beneficial when employed as a roll over wash system.

According to this aspect, the media elements 110 may be positioned at an ideal offset angle when the brush assembly 100 is rotating in both the clockwise direction and the counterclockwise direction because the media elements 110 may be pivoted between the clockwise rotation and counterclockwise rotation positions B, C. As illustrated, the treatment heads 126 are positioned on both the front and back faces 122, 124 of the media elements 110 to provide contact of the treatment heads 126 against passing vehicles regardless of whether the brush assembly is rotating in a clockwise or counterclockwise direction.

It will be appreciated that a variety of other mechanism for achieving the dual rotational direction pivoting, including a hinge secured to an inner edge of the wash media elements. It will also be appreciated that a variety of other suitable ways for limiting the pivotal movement of the wash media elements 110 may be employed.

Figure 6:
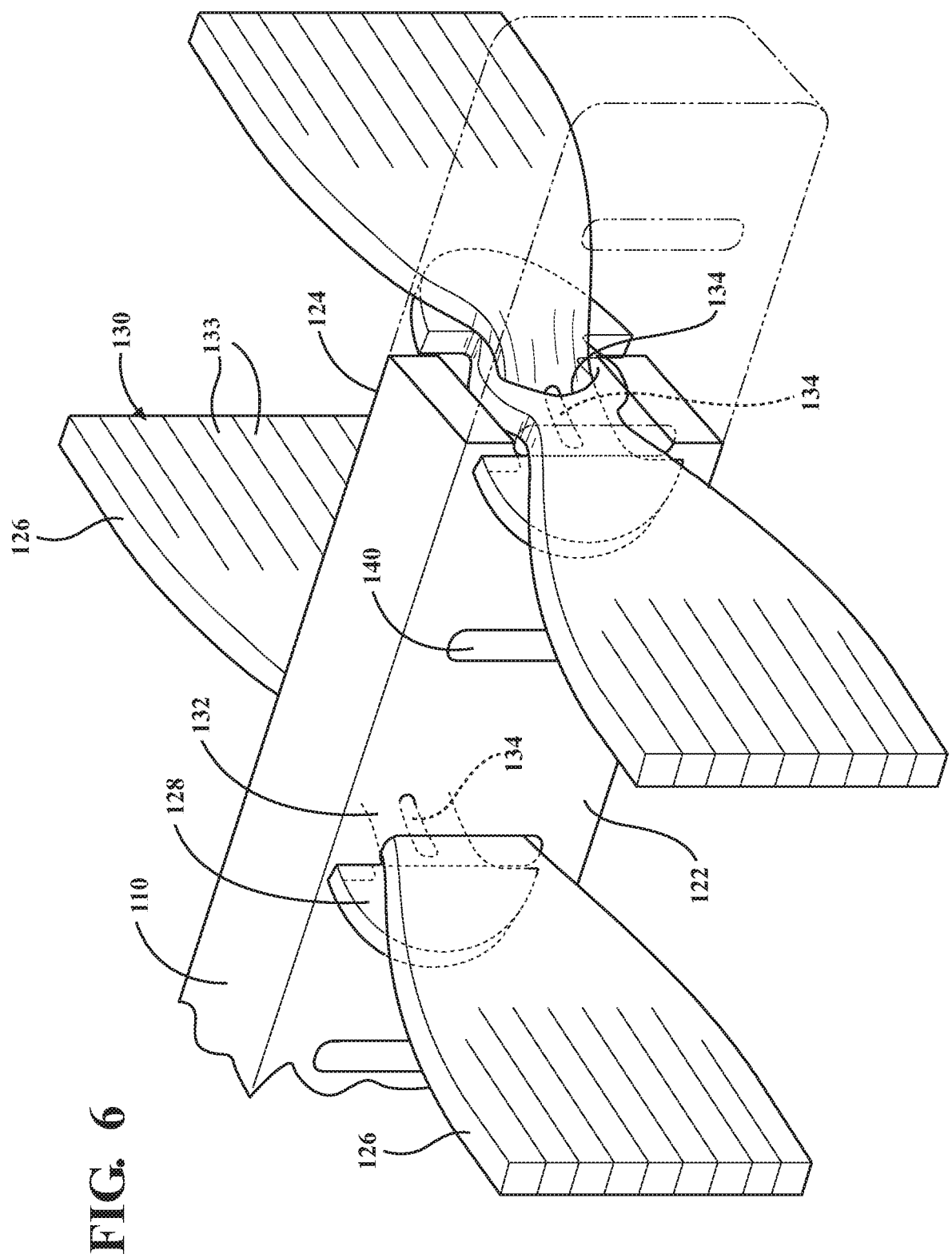
FIG. 6 is an enlarged view of a pair of treatment heads attached to one another and extending from either side of a wash media element for a rotatable vehicle wash component according to an aspect of the disclosure.

Referring now to FIG. 6 which illustrates a pair of treatment heads 126 attached to a media element 110 according to an aspect. As shown, the treatment head 126 includes a base portion 128 that is intended to engage and secure the treatment head 126 to the wash media element 110 and contact portion 130 disposed opposite the base portion 128. The contact portion 130 may be secured to the base portion 128 by a neck portion 132. According to an aspect, the neck portion 132 may have a tapered shape such that it is narrower adjacent the base portion 128 and wider adjacent the contact portion 130. The contact portion 130 may include a plurality of elongated finger segments 133 that are individually moveable upon contact with a vehicle exterior. The base portion 128 has a generally enlarged shape and is configured to pass through an opening 140 in the wash media element and then expand to secure and retain the treatment head 126 to the wash media element. According to an aspect, the neck portion 132 includes a slot 134 formed therein.

According to an aspect where at treatment head 126 may be secured to both the first face 122 and the second face 124 of the wash media elements 110, the treatment heads 126 may be secured to one another in a bow-tie type arrangement. According to an aspect, a treatment head 126 may be secured to one of the first face 122 or the second face 124 by passing it through an opening 140 in the wash media element 110. Thereafter, a second treatment head 126 may be passed through the same opening 140 and also passed through a slot 134 formed in the opposing treatment head 126. This can serve to strengthen the securement of the treatment heads 126 to the wash media element 110. According to an aspect, the treatment heads 126 may be secured to the wash media element 110 by a pointed tool having a slot formed therein such as disclosed in Applicant's co-pending entitled "A Tool for Attaching a Replaceable Treatment Head to a Wash Media Element" and assigned U.S. patent application Ser. No. 15/477,870, now U.S. Pat. No. 10,800,017, the disclosure of which is incorporated by references as though set forth fully herein. It will be appreciated that the treatment heads 126 may be secured to the media elements 110 in a variety of other suitable ways.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A rotary vehicle wash component for a vehicle wash, comprising:
    a hub portion rotatable about an axis of rotation defined by its center;
    a plurality of media elements secured to the hub portion, each of the plurality of media elements including a first face and a second face, the media elements being formed of a self-supporting material such that they substantially retain their shape both when the hub portion is rotating about the axis of rotation and while at rest; and
    the hub portion defining a plurality of reference lines extending from the axis of rotation and through a reference point disposed on a centerline of each of the media elements;
    each of the plurality of media elements secured to the hub portion such that during rotation in a first direction, the centerline of each of the media elements is positioned at a first non-zero angle with respect to the reference lines as measured in the direction of rotation of the hub portion.

2. The wash component of claim 1, wherein the first angle is disposed rearwardly with respect to the plurality of reference lines.

3. The wash component of claim 2, wherein the first angle is between 0 and 33 degrees.

4. The wash component of claim 2, further comprising:
    a plurality of slots formed in the plurality of media elements and extending between the first face and the second face, wherein a plurality of treatments heads are secured to the plurality of media elements utilizing the plurality of slots.

5. The wash component of claim 1, further comprising:
    a plurality of treatment heads secured to the plurality of media elements such that they extend outwardly from the first face of the plurality of media elements.

6. The wash component of claim 1, wherein the first angle is fixed such that it stays the same both during rotation of the hub portion and while the hub portion is at rest.

7. The wash component of claim 1, wherein the plurality of media elements are configured to be disposed at a second angle with respect to the plurality of reference lines upon rotation of the hub portion in a second direction.

8. The wash component of claim 7, wherein a plurality of treatment heads are secured to the media elements such that they extend from the second face of the plurality of media elements.

9. The wash component of claim 7, wherein the second angle is between 0 and 33 degrees.

10. The wash component of claim 7, further comprising a pair of limiting elements disposed on opposite sides of each of the reference lines, wherein the limiting elements are configured to limit pivotal movement of the media elements in response to rotation of the hub portion in both the first and second directions.

11. The wash component of claim 1, wherein the vehicle wash is a roll over type.

12. The wash component of claim 1, wherein the media elements maintain an effective working length regardless of the rotational speed of the hub portion.

13. A rotary wash brush for a vehicle wash comprising:
    a hub portion defining an axis of rotation;
    a plurality of media elements secured to the hub portion such that a centerline of each of the plurality of media elements is offset with respect the axis of rotation when the hub portion rotates in a first direction;
    wherein the centerline does not intersect the axis of rotation when the hub portion rotates in a first direction;
    wherein the hub portion includes a pair of endcaps which engage the plurality of media elements; and
    wherein the pair of endcaps include a plurality of outwardly extending flanges corresponding to the plurality of media elements.

14. The brush of claim 13, wherein the plurality of media elements are formed of a self-supporting material such that they substantially retain their shape both when the hub portion is rotating about the axis of rotation and while at rest.

15. The brush of claim 13, wherein the centerline of each the plurality of media elements is disposed at an angle relative to a reference line that extends through the axis of rotation and a reference point on the centerline.

16. The brush of claim 15, wherein the angle is variable in response to rotation of the hub.

17. The brush of claim 15, wherein the angle is fixed.

18. The brush of claim 15, further comprising:
    a plurality of treatment heads secured to the plurality of media elements such that they extend outwardly from a first face of plurality of media elements.

19. The brush of claim 15, further comprising:
    a plurality of slots formed in the plurality of media elements and extending between a first face and a second face, wherein a plurality of treatment heads are secured to the plurality of media elements utilizing the plurality of slots.

20. The brush of claim 15, wherein the plurality of media elements are configured to be disposed at a second angle with respect to the reference lines upon rotation of the hub portion in a second direction.

21. The brush of claim 20, wherein a plurality of treatment heads are secured to the media elements such that they extend from the second face of the plurality of media elements.

22. The brush of claim 15, wherein the plurality of media elements are pivotally secured to the hub portion.

23. The brush of claim 13, wherein the vehicle wash is a roll-over type.

24. A rotary wash brush for a vehicle wash, comprising:
 a hub portion defining an axis of rotation, the hub portion having first and second end caps at opposing axial ends of the hub portion which each include a plurality of flange portions;
 a plurality of media elements disposed axially between the first and second end caps and secured to the flange portions;
 wherein a centerline of each of the flange portions and the plurality of media elements is disposed offset from the axis of rotation such that the centerline does not intersect the axis of the rotation.

\* \* \* \* \*